(12) United States Patent
Mallart

(10) Patent No.: US 12,126,660 B2
(45) Date of Patent: Oct. 22, 2024

(54) SET-UP OF MEDIA STREAM TRANSMISSION AND SERVER AND CLIENT FOR MEDIA STREAM TRANSMISSION

(71) Applicant: III Holdings 6, LLC, Wilmington, DE (US)

(72) Inventor: Raoul Mallart, Paris (FR)

(73) Assignee: III Holdings 6, LLC, Wilmington, DE (US)

(*) Notice: Subject to any disclaimer, the term of this patent is extended or adjusted under 35 U.S.C. 154(b) by 0 days.

(21) Appl. No.: 17/492,312

(22) Filed: Oct. 1, 2021

(65) Prior Publication Data
US 2022/0030040 A1    Jan. 27, 2022

Related U.S. Application Data

(60) Continuation of application No. 15/428,758, filed on Feb. 9, 2017, now Pat. No. 11,171,998, which is a
(Continued)

(30) Foreign Application Priority Data

Sep. 7, 2009    (EP) .................................... 09169658

(51) Int. Cl.
*H04L 65/1069*    (2022.01)
*H04L 61/2567*    (2022.01)
(Continued)

(52) U.S. Cl.
CPC ...... *H04L 65/1069* (2013.01); *H04L 61/2567* (2013.01); *H04L 65/65* (2022.05);
(Continued)

(58) Field of Classification Search
CPC ............... H04L 65/608; H04L 65/1069; H04L 61/2567; H04L 29/12509; H04L 65/65
See application file for complete search history.

(56) References Cited

U.S. PATENT DOCUMENTS 4,850,891 A    7/1989  Walkup et al.
5,495,533 A    2/1996  Linehan et al.
(Continued)

FOREIGN PATENT DOCUMENTS

EP         0 859 314 A2    8/1998
JP         4019848 B2 *    12/2007
WO     WO 1999015999      4/1999

OTHER PUBLICATIONS

3GPP TS 26.234 V7.8.0, 3rd Generation Partnership Project; Technical Specification Group Services and System Aspects; Transparent end-to-end Packet-switched Streaming Service (PSS); Jun. 2009 (Year: 2009).*

(Continued)

*Primary Examiner* — Gregory Todd
(74) *Attorney, Agent, or Firm* — Crowell & Moring LLP

(57) ABSTRACT

A media stream is transmitted from a server device to a client device. The client device (10) transmits set-up request messages (43a), discovery messages (44b) and a play command message (45a). The server receives versions of the set-up request messages 43b), the discovery message (44b) and the play message (45b) with matching identifier in the payloads if the messages. The server device (12) receives the discovery messages (44b) on a predetermined port and stores information recording that the discovery messages (44b) have been received, at least when no corresponding set-up request message 43b has been received before. The server device (12) compares the identifiers from the received set up request message (43b) and the discovery message (44b) according to the information recording reception, at least when the discovery message (44b) has been received before the set-up request message (43b). The server device (12) selects transport parameters for transmission of the media stream responsive to detection that the first and second identifier have matching values, the selected trans- (Continued)

port parameters being based on data from said set-up request message (43b) and a port identification from a source field of the discovery message (44b). The media stream is transmitted in accordance with the selected transport parameters to the client device (10) addressed to the port determined from the source field of the discovery message (44b).

3 Claims, 5 Drawing Sheets

Related U.S. Application Data continuation of application No. 14/042,862, filed on Oct. 1, 2013, now Pat. No. 9,571,548, which is a division of application No. 12/876,270, filed on Sep. 7, 2010, now Pat. No. 8,578,033.

(51) Int. Cl.
| | |
|---|---|
| *H04L 65/65* | (2022.01) |
| *H04L 5/00* | (2006.01) |
| *H04L 65/60* | (2022.01) |
| *H04L 67/51* | (2022.01) |
| *H04L 69/16* | (2022.01) |

(52) U.S. Cl.
CPC ............ *H04L 5/0055* (2013.01); *H04L 65/60* (2013.01); *H04L 67/51* (2022.05); *H04L 69/161* (2013.01)

(56) References Cited

U.S. PATENT DOCUMENTS

| | | | |
|---|---|---|---|
| 5,732,077 A | 3/1998 | Whitehead | |
| 5,801,985 A | 9/1998 | Roohparvar et al. | |
| 5,930,167 A | 7/1999 | Lee et al. | |
| 6,026,077 A | 2/2000 | Iwata | |
| 7,035,854 B2 | 4/2006 | Hsaio et al. | |
| 7,127,633 B1 | 10/2006 | Olson et al. | |
| 7,187,671 B2 | 3/2007 | Moyano et al. | |
| 7,243,351 B2 | 7/2007 | Kundu | |
| 7,568,199 B2 | 7/2009 | Bozak et al. | |
| 7,594,259 B1 | 9/2009 | Audet | |
| 7,626,966 B1 | 12/2009 | Ruiter et al. | |
| 7,685,602 B1 | 3/2010 | Tran et al. | |
| 8,196,133 B2 | 6/2012 | Kakumani et al. | |
| 8,489,476 B1 | 7/2013 | Lester et al. | |
| 8,578,033 B2 | 11/2013 | Mallart | |
| 8,726,278 B1 | 5/2014 | Shawver et al. | |
| 9,571,548 B2 | 2/2017 | Mallart | |
| 2002/0032716 A1 | 3/2002 | Nagato | |
| 2002/0059094 A1 | 5/2002 | Hosea et al. | |
| 2002/0071390 A1 | 6/2002 | Reeves et al. | |
| 2002/0191596 A1 | 12/2002 | Moyano et al. | |
| 2003/0126013 A1 | 7/2003 | Shand | |
| 2003/0154112 A1 | 8/2003 | Neiman et al. | |
| 2003/0228842 A1 | 12/2003 | Heinonen et al. | |
| 2004/0015973 A1 | 1/2004 | Skovira | |
| 2004/0109428 A1 | 6/2004 | Krishnamurthy | |
| 2004/0257876 A1 | 12/2004 | Vimercati | |
| 2004/0267876 A1 | 12/2004 | Kakivaya et al. | |
| 2005/0079817 A1 | 4/2005 | Kotola et al. | |
| 2005/0091545 A1 | 4/2005 | Soppera | |
| 2005/0149480 A1 | 7/2005 | Deshpande | |
| 2005/0259637 A1 | 11/2005 | Chu et al. | |
| 2005/0281260 A1 | 12/2005 | Swanson et al. | |
| 2006/0048157 A1 | 3/2006 | Dawson et al. | |
| 2006/0178954 A1 | 8/2006 | Thukral et al. | |
| 2006/0291386 A1* | 12/2006 | Jyske | H04L 65/611 370/412 |
| 2008/0065775 A1 | 3/2008 | Polk | |
| 2008/0228912 A1* | 9/2008 | Vedantham | H04N 21/6582 709/224 |
| 2009/0259763 A1 | 10/2009 | Karlsson | |
| 2010/0223357 A1 | 9/2010 | Einarsson | |
| 2010/0332674 A1 | 12/2010 | van Gassel | |
| 2011/0179134 A1 | 7/2011 | Mayo et al. | |
| 2011/0292928 A1 | 12/2011 | Yin et al. | |
| 2015/0172733 A1* | 6/2015 | Tokumo | H04N 21/458 725/98 |
| 2017/0244763 A1 | 8/2017 | Mallart | |

OTHER PUBLICATIONS

Westerlund et al., The evaluation of different NAT traversal Techniques for media controlled by Real-time Streaming Protocol (RTSP) draft-ietf-mmusic-rtsp-nat-evaluation-01, Jul. 11, 2008 (Year: 2008).*

Tomita Nobuyoshi, JP2004072291—Address Translation Device, https://patentscope.wipo.int/search/en/detail.jsf?docId=JP269799192 &_cid=P22-LQYHHI-76753-1, JP2004072291 Japanese to English Translation. (Year: 2024).*

JP2004072291 English translation, "Address Translation Device" (Year: 2004).*

Bader et al.; "Applications"; The International Journal of High Performance Computing Applications, vol. 15, No. ; pp. 181-185; Summer 2001.

Coomer et al.; "Introduction to the Cluster Grid—Part 1"; Sun Microsystems White Paper; 19 pages; Aug. 2002.

Joseph et al.; "Evolution of grid computing architecture and grid adoption models"; IBM Systems Journal, vol. 43, No. 4; 22 pages; 2004.

Smith et al.; "Grid computing"; MIT Sloan Management Review, vol. 46, Iss. 1.; 5 pages; Fall 2004.

"Microsoft Computer Dictionary, 5th Ed."; Microsoft Press; 3 pages; 2002.

"Random House Concise Dictionary of Science & Computers"; 3 pages; Helicon Publishing; 2004.

Extended European Search Report mailed Feb. 18, 2010, issued in corresponding EP Application No. 091696583, tiled Sep. 7, 2009, 6 pages.

Handley, M_, et al_, "SDP: Session Description Protocol," Network Working Group, University of Glasgow, Jul. 2006, <https://toolsietiorg/htmlirfc4566>, 50 pages.

Shulzrinne, H., et al_ "Real Time Streaming Protocol 2.0 (RTSP)," MMusic Working Group, Internet-Draft, Columbi. University, Mar. 2009, <https://tools.iefforg/html/draft-ieff-mmusic-rfc2326bis-20>, 285 pages.

Westerlund, M., et al., "The Evaluation of Different NAT Traversal Techniques for Media Controlled by Real-Time Streaming Protocol (RTSP)," Network Working Group, Internet-Draft, <https://tools.ietf.org/html/draft-ietf- mmusic-rtsp-nat-evaluation-00>, Jun. 2007, 37 pages.

Westerlund, M., et al., "The Evaluation of Different NAT Traversal Techniques for Media Controlled by Real-Time Streaming Protocol (RTSP)," Network Working Group, Internet-Draft, <https://tools.ietf.org/html/draft-ietf-mmusic-rtsp-nat-evaluation-01>, Jul. 2008, 37 pages.

Westerlund et al. "The evaluation of different NAT traversal Techniques for media controlled by Real-time Streaming Protocol (RTSP) draft-ietf-mmusic-rtsp-nat-evaluation-00", Jun. 29, 2007, pp. 1-36. (Year: 2007)

Viamonte et al., Requirements for the Optimization of Session Setup Delay and Service Interactivity in Streaming Services over 3G, IEEE Xplore, 12th European Wireless Conference 2006—Enabling Technologies for Wireless Multimedia Communications (pp. 1-10), Apr. 1, 2006 (Year: 2006).

Westerlund et al, "The evaluation of different NAT traversal Techniques for media controlled by Real-time Streaming Protocol (RTSP)", Jul. 11, 2008, Network Working Group Internet-Draft, draft-ietf-mmusic-rtsp-nat-evaluation-01 (Year: 2008)

Rosenberg, J., "Interactive Connectivity Establishment (ICE): A Protocol for Network Address Translator (NAT) Traversal for Offer/Answer Protocols", Oct. 29, 2007, M Music Internet-Draft, draft-ietf-mmusic-ice-19 (Year: 2007)

Goldberg et al, "A Network Address Translator (NAT) Traversal mechanism for media controlled by Real-Time Streaming Protocol

(56) References Cited

OTHER PUBLICATIONS (RTSP)", Jul. 13, 2009, Network Working Group Internet-Draft, draft-ietf-mmusic-rtsp-nat-08 (Year: 2009)
Schulzrinne et al., RTSP 2.0, 05-2008, https://tools.ietf.org/html/draft-ietf-mmusic-rfc2326bis-18, pp. 1-246. (Year: 2008)
Caesar et al., "Design and Implementation of a Routing Control Platform," Usenix, NSDI '05 Paper, Technical Program, obtained from the Internet, on Apr. 13, 2021, at URL <https://www.usenix.org/legacy/event/nsdi05/tech/full_papers/caesar/caesar_html/>, 23 pages.

* cited by examiner

SET-UP OF MEDIA STREAM TRANSMISSION AND SERVER AND CLIENT FOR MEDIA STREAM TRANSMISSION

This application is a continuation of U.S. patent application no. 15/428,758, filed on Feb. 9, 2017, which is a continuation of U.S. patent application no. 14/042,86, filed on Oct. 1, 2013 (now U.S. Pat. No. 9,571,548), which is a divisional of U.S. patent application no. 12/876,270, filed on Sep. 7, 2010 (now U.S. Pat. No. 8,578,033), which claims the priority under 35 U.S.C. § 119 of European patent application no. 09169658.3, filed on Sep. 7, 2009, the contents of all of which are incorporated by reference herein.

FIELD OF THE INVENTION

The invention relates to a method of transmitting a stream of data through a communication network and to devices for use in such a network.

BACKGROUND OF THE INVENTION

Media streaming from a server to client involves transmission of a stream of messages, preceded by a set-up phase, in which the client sends a commands to start the stream and the client and server set up parameters that are needed for the transmission. To the user, the set-up phase appears as a slow response that delays the start of service. This is especially so when roundtrip transmission via a wireless network are needed. Therefore it is desirable to reduce the duration of the set-up phase as much as possible.

According to the IETF RTSP protocol described in RFC2326bis, the set-up phase involves one or more "set-up" commands transmitted via the network from a client device to a server device, with a reply from the server device to the client device, followed by a play command from the client device. In addition a "describe" command may be needed, to obtain further parameters.

To speed up the set-up phase, pipelining of the commands may be used. This involves transmitting commands before replies to the preceding commands have been received, but this is not possible when a command depends on information from a reply to a preceding command.

Further delay can occur when the client device is "visible" on the network only via a firewall or a network address translator (NAT). In this case the client device cannot specify its own address, or even which of its ports data must be addressed from the stream output port(s) of the server device. To solve this problem the client devices sends discovery messages to the stream output ports of the server device through the firewall or network address translator. This enables the server device to recover the necessary address from the source address of these discovery messages, including an identification of the port if necessary. The need for an additional discovery message increases the set-up delay. The increased delay can be significant because the address discovery introduces a dependency between commands that limits the possibility of pipelining. Moreover, plurality of discovery messages may be needed in the case of lost traffic.

SUMMARY OF THE INVENTION

Among others, it is an object to reduce the delay involved with the set-up of a media stream.

A network client device is provided that transmits a set-up request message and a discovery message. The discovery message is transmitted from a port of the client device to which the media stream must be sent. The discovery message serves to probe the identity of the port that may be assigned by a firewall or network address translator between the client device and a server device.

The discovery message is transmitted without waiting for acknowledgement of reception of the set-up request message. The discovery message is linked to the set-up request message by including matching client device selected identifiers in their payload fields. The set-up request message and the discovery message are sent to predetermined ports of the server device. Because the client device transmits the discovery message and the set-up request messages to different ports, without waiting for acknowledgement of reception of the set-up request message, the discovery message may arrive before the set-up request message.

The server device receives the discovery message and stores information recording that the discovery message has been received. In an embodiment, the entire message may be recorded, but it suffices to record information regarding the message. Thus, in another embodiment the fact that the message has been received, an identifier from the payload of the message and an source address and port of the message are recorded. The server device compares the identifiers of received set up request messages and the discovery messages according to the information with which reception was recorded, at least for discovery messages that are received before the set-up request messages with which their identifiers are compared. The server device selects transport parameters for transmission of the media stream responsive to detection that the first and second identifier have matching values, the selected transport parameters being based on data from said set-up request message and a port identification from a source field of the discovery message.

In an embodiment the server device comprises a controller and a media streamer. The controller intercepts set-up request message for the media streamer, only to pass these set-up request messages once they have been paired to discovery messages on the basis of the identifiers.

In an embodiment the client device transmits a plurality of set-up requests and a play command, the set-up requests defining transport parameters for a video sub-stream, an audio sub-stream etc and the play command triggering the joint start of play of these sub-streams. In this embodiment discovery messages for the different sub-streams are sent to different predetermined ports of the server device. The server device receives the plurality of set-up request messages and determines from the set-up messages at which of a number of predetermined ports it should look for corresponding discovery messages. If the set-up request message is a request message for audio or video, the server device may look at predetermined ports for audio or video respectively, for example. When discovery messages from these ports with matching identifiers have been found, using recorded information about reception of the discovery messages at least when the discovery messages have been received before the set-up request messages, transport parameters are selected. Start of play is delayed until after pairs of matching set-up requests and discovery messages have been detected for each of the received set-up messages for the media stream. When a play command is used, a response to this command may be delayed until pairs have been detected for all set-up messages for the media stream that have been received before the play command for that media stream.

BRIEF DESCRIPTION OF THE DRAWINGS

These and other objects and advantageous aspects will become apparent from a description of exemplary embodiments, using the following figures.

DETAILED DESCRIPTION OF THE EMBODIMENTS

Figure 1:
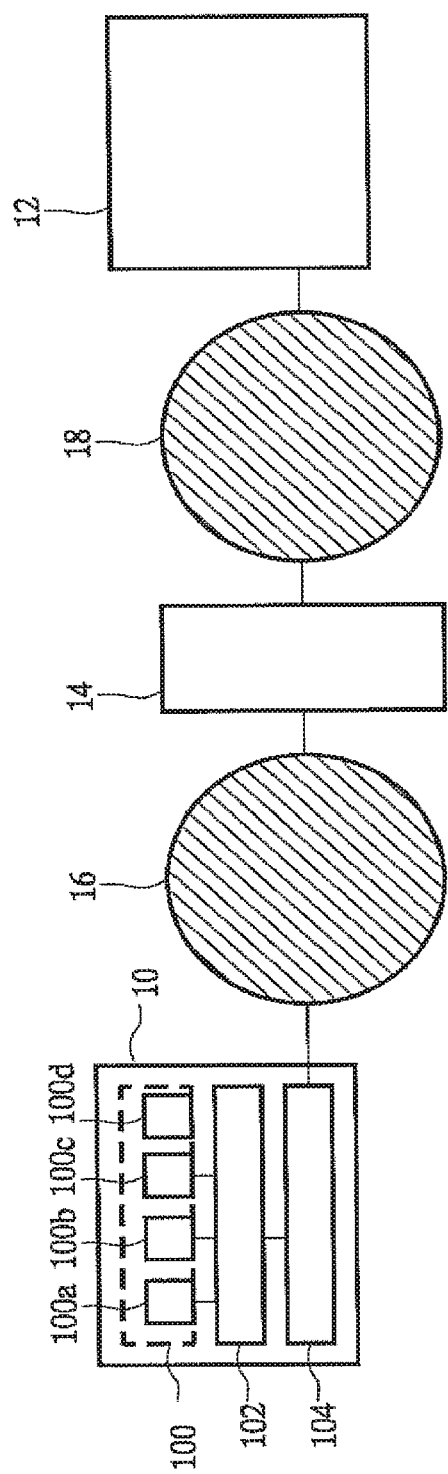
FIG. 1 shows a communication system

FIG. 1 shows a communication system, comprising a client device 10, a server device 12, an intermediate device 14 and first and second networks 16, 18 coupling client device 10 to intermediate device 14 and intermediate device 14 to server device 12 respectively.

In operation, server device 12 is used to transmit a series of messages containing data form a media stream to one or more ports of client device, after a set-up phase wherein the media stream and transport parameters for transmitting the stream are selected. In the set-up phase client device 10 transmits one or more set-up request messages for a specific streaming session as well as one or more discovery messages associated with these set-up request messages to predetermined ports of server device 12. The one or more discovery messages are sent from one or more ports of client device 10 to indicate that these ports must be used to address the messages in the media stream. Before starting play, server device 12 waits until it has received discovery messages for all media types for which the stream is set-up.

Client device 10 and server device 12 each comprise a plurality of communication layers. By way of example, three communication layers are illustrated in client device 10, although it should be understood that more layers may be present or that the illustrated layers themselves may be composed of sub-layers. Each layer may be implemented using a programmable computer, programmed with a computer program to make the programmable computer perform the functions of the layer. Alternatively, dedicated circuits may be used to implement part or all of the functions of the layers. The illustrated layers include an application layer 100 with a setup controller 100a and a media streamer 100b, an intermediate layer 102 and an interface layer 104 configured to transmit and receive packets via first network 16. Server device 12 may have similar layers.

The packets comprise a destination field with a network address and port identification and a payload field. Setup controller 100a is configured to set up stream transmission and streamer 100b is configured to process a received stream, for example to control display of video images base on a stream of video data. Setup controller 100a is configured to indicate port identifications to intermediate layer 102 that are associated with streamer 100b. Other port identifications may be associated with other components 100c,d in application layer 100.

Intermediate layer 102 is configured to form packets with port identifications selected by setup controller 100a and data from set-up controller 100a in the payload field and to supply these packets to interface layer 104 for transmission. Intermediate layer 102 is configured to receive packets from interface layer 104 and to supply extracted payload data from those packets that have port identifications associated with setup controller 100a or streamer 100b to setup controller 100a and streamer 100b respectively.

Figure 2:
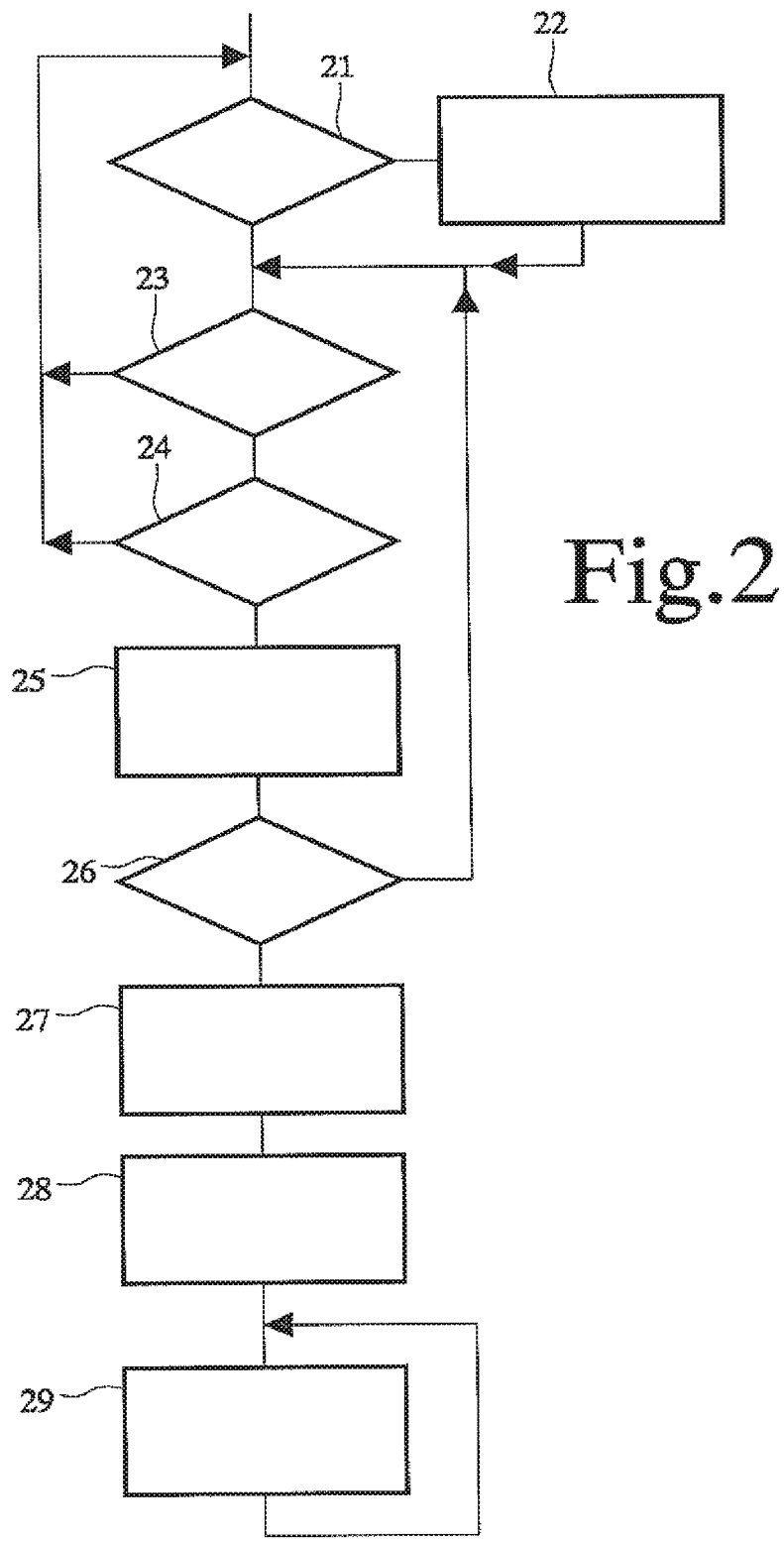
FIG. 2 shows a flow chart of operation of a server device
Figure 3:
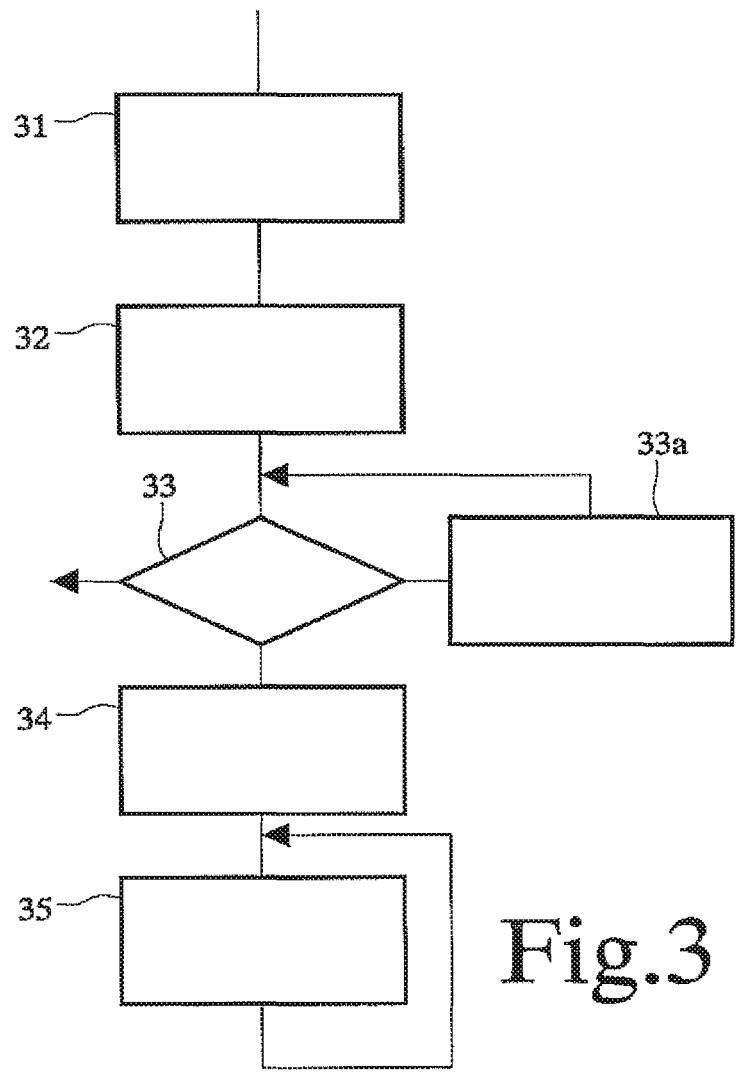
FIG. 3 shows a flow chart of operation of a client device
Figure 4:
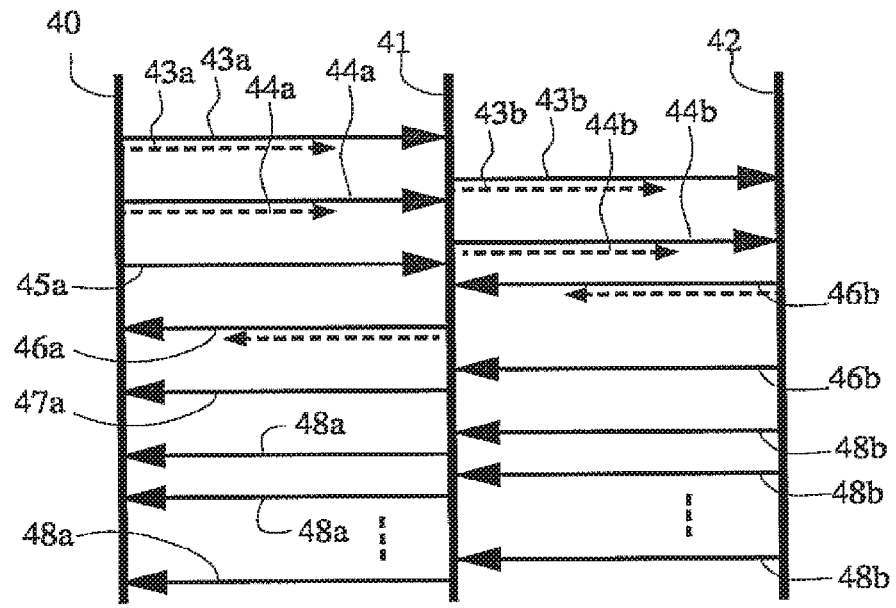
FIG. 4, 4a illustrate message traffic between client and server device
Figure 4A:
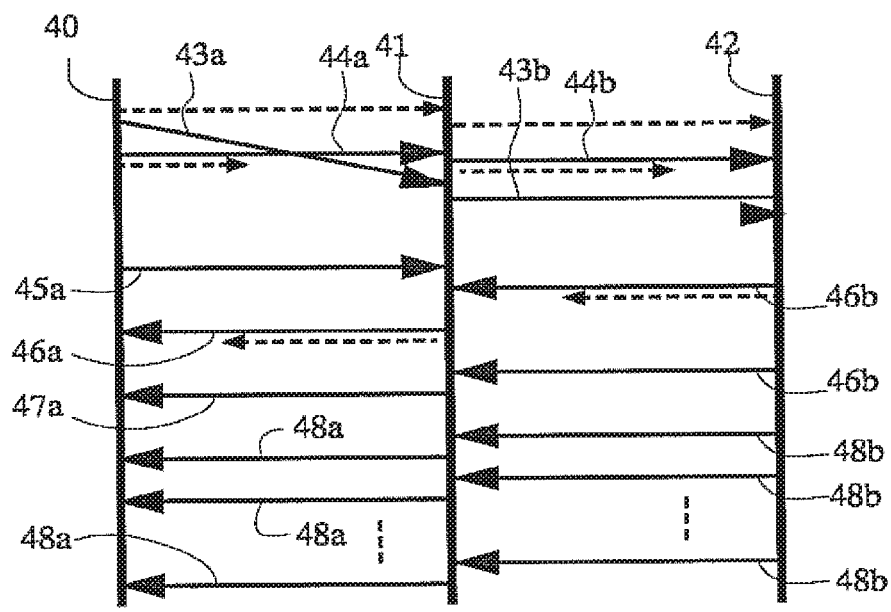
Figure 5:
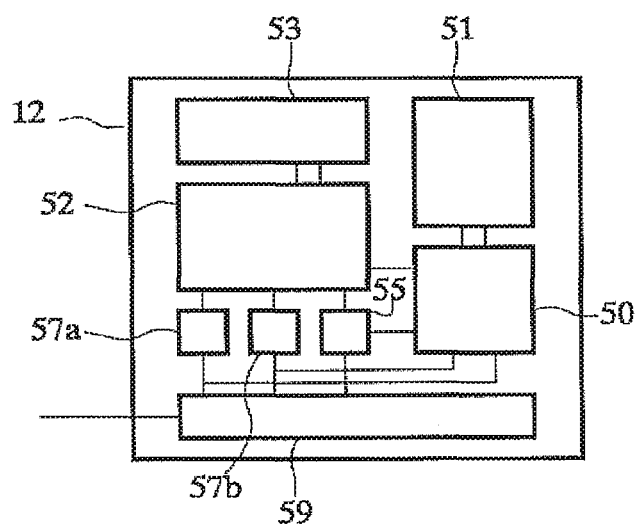
FIG. 5 shows an embodiment of a server device.

FIGS. 2 and 3 show flow charts of operation of server device 12 and client device 10 respectively. FIG. 4, 4a illustrate message traffic between client device 10 and server device 12. FIG. 5 shows an embodiment of server device 12. In FIG. 4 client device 10 and server device 12 are symbolized by a first and second vertical line 40, 42 and intermediate device 14 is symbolized by a third vertical line 41. Messages are symbolized by arrows. The messages include a setup request message 43a,b, a discovery message 44a,b and a play message 45a,b from client device 10 to server device 12, as well as a series of stream messages 48a,b and a set-up response message 46a,b and a play response message 47a,b from server device 12 to client device 10 in response to setup request message 43a,b and play message 45a,b. A plurality of setup request messages, discovery messages and corresponding set-up responses may be send, which is indicated by dashed arrows. The payload data field of a set-up message may comprise a string of character codes, such as

```
SETUP rtsp://server.com/media.3gp/trackID=3 RTSP/1.0
Cseq: 3
Session 968367008
Transport:rtp;avp;unicast;client_port=<a>;server_port=<b>;
```

In this example, the character codes for SETUP identify the message as a set-up request message, the string "rtsp . . . " identifies the required stream content, the strings "RTSP/1.0" Cseq: 3 and "Transport . . . "define further transport parameters such as the requested protocol, port numbers (with values denoted by <a> and <b>) etc. Furthermore the string "Session: . . . " in the set-up request message defines an identifier value. It should be noted that this set-up request from client device 10 includes a server port number and a session identifier, parameters that are normally selected by server device 12. The payload data of the discovery message 44a,b that corresponds to the set-up request message 43a,b contain the same session identifier.

The payload data field of set-up response may take comprise a string of character codes such as

```
RTSP/1.0 200 OK
Cseq: 3
Session 968367008
Transport:rtp/avp;client_port=<a>;server_port=<b>;ssrc=2A3F93ED
```

In this example, the set-up response confirms acceptance of a number of parameters from the set-up request, including the session identifier and supplies further parameters. Although a single set-up and set-up response message are shown by way of example, it should be appreciated that a plurality of such set-up and set-up response messages for different types of stream may be used, for example to set-up video and audio streams for a session.

Intermediate device 14 may be a conventional interface between networks, which receives the transmitted messages 43a, 44a, 45a from client device 10 and responses 46b, 47b from server device 12 via first and second networks 16, 18 respectively and forwards translated versions 43b, 44b, 45b, 46a, 47a of these messages to the server device 12 and the client device via second and first networks 18, 16 respectively. When intermediate device 14 is a network address translator or firewall, it may translate addresses in source and destination fields of the messages 43a, 44a, 45a, 46b, 47b, including port identifications in those fields.

Intermediate device 14 may maintain one or more stored address translation tables, representing for example a pairing relation between source addresses for use in messages to second network 18 and addresses of devices coupled to first network 16 (only client device 10 is shown, but more devices may be present). Alternatively, or in addition, the address translation tables may represent a pairing relation between ports of intermediate device 14 for use in messages over second network 18 and ports and/or addresses of devices coupled to first network 16. Intermediate device 14 may use the one or more tables to select source addresses for outgoing messages on second network 18 based on the source address of the message on first network 18 and/or output ports for transmitting the outgoing messages. In the opposite direction intermediate device 14 may use the one or more tables to select addresses of destination devices (e.g. client device 10) on first network 16 for forwarding messages from second network 18 based on the destinations addresses and/or ports with/at which the message are received from second network 18. As an additional protection measure, intermediate device 14 may be configured to pass messages from second network 18 only from addresses and/or ports at addresses to which messages have previously been sent via intermediate device 14.

Although an example is shown wherein the order of transmission of the messages corresponds to the order of reception, it should be appreciated that the order of transmission and reception may be mutually different. Operation of first and second networks 16, 18 and intermediate device 14 may have the effect that the order of transmission of the messages does not correspond to the order of reception. Thus, reception of a version 44b of a discovery message 44a may precede reception of a version 43b of a set-up message, even though the discovery message 44a was transmitted after the set-up message 43a. This is illustrated in FIG. 4a.

Set-up controller 100a effectively defines a composite set-up request that comprises the set-up request message 43a and the discovery message 44a that are transmitted from and to different ports. Server device 12 uses the source port in the source field of the version 43b of the discovery message that arrives at server device in combination with parameters from the received version 43b of the set-up request message to set up a media stream.

Intermediate device 14, and/or networks 16,18 may have the effect that the temporal order of reception of messages differs from the temporal order of transmission. This is illustrated in FIG. 4a, wherein a set-up message 43b is shown to arrive after a discovery message 44b, although the set-up message was sent from the client before the discovery message.

FIG. 5 shows an embodiment of server device 12, comprising a media streamer 50, a media storage device 51, a controller 52, a controller memory 53, a command message handler 55, a plurality of discovery message handlers 57a,b, a network interface 59. Controller 52 has interfaces to controller memory 53, command message handler 55 and discovery message handlers 57a,b and an output coupled to media streamer 50. Command message handler 55 and discovery message handlers 57a,b are associated with respective different port identifications of server device 12. Otherwise command message handler 55 and discovery message handlers 57a,b may have the same structure, the labels "command" and "discovery" serving only to distinguish the handlers. At least command message handler 55 may be configured to restore the order of command messages addressed to its associated port of server device 12 and to queue the messages in a buffer. Media streamer 50, command message handler 55 and discovery message handler 57a,b are coupled to network interface 59. The outputs of media streamer 50 are coupled to the same ports as discovery message handlers 57a,b. Media streamer 50 is coupled to media storage device 51 and it has an input coupled to command message handler 55.

FIG. 2 shows a process of operation of server device 12 to establish streaming with a client device 10. It should be emphasized that server device 12 may be configured to set up streaming with any client device 10, or even with any number of client devices 10 in parallel, without knowing the identity of the client devices in advance. The steps involved with a single client device 10 will be emphasized, but it should be kept in mind that in parallel with this messages from other client devices 10 may arrive.

In a first step 21 controller 52 tests whether a discovery message handler 57a,b has received a version of discovery message 44b directed at the port with which discovery message handler 57a,b is associated. If controller 52 detects such a message, controller 52 performs a second step 22, wherein it stores information recording the address and port identification from the source field of the received version discovery message 44b, in combination with an identifier from a payload field of received version of the discovery message 44b. From second step 22 or, if no discovery message has been received, from first step 21, the process proceeds to a third step 23.

In third step 23, controller 52 tests whether command message handler 55 has received a version of a set-up request message 43b directed at the port with which command message handler 55 is associated or, in an embodiment, whether it has recorded such a set-up request message previously. The setup request from client device 10 specifies the transport mechanism to be used for the streamed media, including transport parameters that are acceptable to the client device 10. If a version of the set-up request message 43b has been received, controller 52 executes a fourth step 24, wherein it tests whether it has recorded information that indicates earlier reception of a version of a discovery message 44b, that has a recorded identifier from said discovery message that matches an identifier in the payload field of the set-up request message and a source address that matches the source address of the received version of the set-up request message 43b for the media stream for which set-up is requested.

If information that meets these conditions is found in fourth step 24, controller 52 executes a fifth step 25, wherein controller 52 forwards the set-up request to media streamer 50. Moreover, controller 52 supplies a port identification based on the stored information about the discovery message 44b to select a destination port for transmission of the stream to the port from which the discovery message was sent. Media streamer 50 selects the actual transport parameters to be used for streaming the media stream, using the supplied port identification. When the parameters and the identifier from the set-up request message are acceptable, media streamer 50 copies these parameters and uses the identifier as session identifier. Media streamer 50 records the selected session identifier and the transport parameters in association with the address of client device 10. Still in fifth step 25, media streamer 50 causes command message handler 55 to send a set-up response message 46b back to client device 10, the response message comprising the selected transport parameters and the one or more session identifiers, in response to set-up request message 43b.

If fourth step 24 shows that no discovery message was received, controller 52 proceeds back to first step 21, leaving the set-up request message in the message queue of command message handler 55 or after executing a sub-step (not shown) wherein it stores information to record the set-up request message. Optionally, the set-up response may be sent in this sub-step as well, instead of in fifth step 25. After fifth step 25 controller 52 proceeds to execute a sixth step 26.

First step 21 to fifth step 25 may be executed for different client devices 10 and for respective types of stream for the same client device 10, such as corresponding audio and video streams of an audiovisual content item, using set-up request messages and discovery messages for each media stream, for the ports to be used for the respective streams.

Set-up requests may be used that identify the type of stream to which they apply. Discovery messages for different types of stream may be distinguished according to the port of server device 12 at which they arrive, i.e. according to the message handler 57a,b from which controller 62 obtains the discovery message. Set-up requests from different client devices 10 may be distinguished on the basis of the source addresses of the received messages.

Controller 52 may record information from the discovery message such as an identifier in association with the identifications of the type of stream, the source address and port of the messages. Controller 52 may execute fifth step 25 only for those types of stream for which both a set-up message and a discovery message with the same source address have been received.

Controller 52 may be configured to test for a source address whether fifth step 25 has been executed for all types of stream corresponding to the set-up request messages that have been received with that source address, before proceeding to sixth step 26 for the source address, repeating the process from first step 21 otherwise. In an embodiment the process from first step 21 is repeated concurrently with execution of sixth step 26 and the steps that follow it, to set up other streams for source addresses corresponding to other client devices 10 (i.e. the addresses used for the client devices 10 by intermediate device 14).

Summarizing, server device 12 "listens" for setup request messages at a command port and discovery messages at a number of predetermined ports that are to be used for respective parts (audio, video) of a media stream. Server device 12 stores information that records that setup request messages and/or discovery messages were received, at least when no stored record of a corresponding discovery message and/or setup request message can be found respectively. The recorded information indicates an identifier from the payload of the received setup request messages and/or discovery messages, the source address and, in the case of the discovery messages, the port number from the source address of the message. The port at which the discovery message was received is also indicated, for example by storing records for messages that were received at different ports in different tables, associated with the respective ports.

When server device 12 receives a setup request message or a discovery messages, it (that is, its controller) searches the stored information for a matching a discovery messages or setup request message respectively, i.e. a message with the same source address and the same identifier the setup request message requesting setup of a media type corresponding to the port at which the discovery message was received. Server device 12 responds to a subsequent play message only once matching pairs of a setup request message and a discovery message have been found for all stream parts, with source addresses corresponding to the source address of the play message. Then play of the parts is started from the predetermined ports at which the discovery messages were received addressed to the ports from the source field of these discovery messages. In an embodiment a plurality of different predefined ports of server device 12 may be provided for the same type of stream part (e.g. video). In this embodiment server device 12 searches discovery matches from each of these ports for a match with a setup request message for that type of stream part and selects the port of server device 12 on which the discovery message was received for returning the stream part of this type (e.g. video).

In sixth step 26, controller 52 tests whether command message handler 55 has received a version of a play message 45b directed at the port with which command message handler 55 is associated, from the source address corresponding to a client device 10 for which pairs of set-up request and discovery messages have been found or, in an embodiment, whether such a play message has been recorded. If sixth step 26 shows that another set-up request message has been received instead of a play message, the process may return to third step 23.

The play message contains information telling server device 12 to start sending data from the stream or streams using the transport parameters selected in response to the setup request message or messages. If a version of the play message 45b has been received, controller 52 forwards the play message to media streamer 50 in seventh step 27, and media streamer 50 executes an eighth step 28, causing command message handler 55 to send a response back to client device 10 to acknowledge the play command and controller 52. Subsequently media streamer 50 repeatedly executes a ninth step 29, wherein it sends successive media content messages 48b containing the stream data from one or more ports on which server device 12 received the discovery messages 44b, to the ports obtained from the discovery messages and the source address of the play message, the discovery messages and the set-up request messages. Optionally, the media content messages 48 may be sent form different ports of server device 12, when it is known that intermediate device 14 translates addresses properly, even if they are sent from the other ports. Optionally seventh step 27 may comprise an additional test to detect whether matching discovery messages 44b have been found for each received set-up request message 43b for the same session identifier as the play message 45b, the process storing information for future use, indicating that the play message has been received, and returning to first step 21 otherwise.

Although FIG. 2 shows one example of the sequence of handling set-up request and discovery messages, it should be appreciated that different sequences may be used. Thus, testing of discovery messages may follow handling of set-up requests, or even after reception of the play message. However, the play message is effectuated only after corresponding discovery messages and set-up requests messages have been found. If a set-up request message specifies parameters that cannot be supported by server device 12, server device 12 may respond by returning a warning message (not shown) and client device 10 may be configured to respond to the warning message by retrying the set-up message with modified parameters.

In an embodiment controller 52 may keep the recorded information from discovery message 44b, set-up request message 43a and play message 45a stored indefinitely as long as seventh step 27 is not reached. However, it is preferred to impose a time limit, for example by recording the information in association with time stamps and discarding or ignoring the recorded information in the process of FIG. 2 when the time stamp and a current clock time value indicate that the age of the information exceeds a threshold value.

FIG. 3 shows a flow-chart of operation of client device 10. In a first step 31, set-up controller 100a causes intermediate layer 102 to send one or more set-up request messages 43a for respective types of streams (e.g. audio and video), addressed to the port that is associated with command message handler 55 of server device 12. Set-up controller 100a causes intermediate layer 102 to send one or more discovery messages 44a addressed to the one or more ports of server device 12 that are associated with discovery message handlers 57a,b for the respective types of stream. Optionally, set-up controller 100a selects an identifier and includes this identifier in all set-up request and discovery messages 43a, 44a. Setup controller 100a uses different ports of client device 10 for transmitting the set-up request message 43a and the discovery message 44a. The one of more discovery messages 44a are transmitted from the ports that will be used to receive stream data for streamer 100b.

In a second step 32 set-up controller 100a causes intermediate layer 102 to send a play message 45a addressed to the port that is associated with command message handler 55 of server device 12.

In a third step 33 set-up controller 100a tests whether responses are received back to the one or more set-up request messages 43a and play message 45b. Third step 33 is repeated until responses have been received back. Optionally, the test for a response to the one or more set-up request messages 43a is executed before second step 32, second step 32 being executed only once response to the one or more set-up request messages 43a has been received back. If no response has been received back that confirms receipt of a discovery message 44a set-up controller 100a optionally executes a sub-step 33a, wherein it repeats transmission of the discovery message 44a. The one or more discovery messages 44a may be transmitted in the form of UDP packets, that is, using a protocol that does not guarantee delivery of the packets.

Once third step 33 shows that the responses have been received set-up controller 100a executes a fourth step 34, wherein it initializes streamer 100b according to the selected transport parameters and one or more session identifiers from the responses. Subsequently streamer 100b repeatedly executes a fifth step 35, receiving messages with stream data from the port or ports that was or were used to transmit one or more discovery messages 44a and processing this stream data, for example by decoding image information from the stream data and using the decoded image information to control image display on an image display device (not shown).

In this way set-up controller 100a effectively defines a composite set-up request that comprises the set-up request message 43a and the discovery message 44a that are transmitted from and to different ports. Server device 12 pairs a received version of the set-up request message 43a with a discovery message 44b and sets up media streams using information from the set-up request message 43b and the port identification from the received version of the discovery message 44b that has been paired with the set-up request message 43b. Pairing ensures that a minimum of roundtrip messages is needed.

A predetermined port of server device may be used to address the discovery request messages 43a. In an embodiment server device 12 may advertise this port number in response to query messages. As described, client device 10 may be configured to wait for reception of a set-up response 46a before transmitting a play message 45a. In this case server device 12 need look for play commands only after sending a set-up response 46b. However, the process can be speeded up by transmitting the play message 45a before reception of the set-up response 46b, supplying information to tie the play message 45a and the set-up response 46b.

An embodiment has been described wherein client device 10 selects a session identifier and supplies this identifier in set-up request messages and discovery messages to server device 12, server device 12 using the session identifier to search for pairs of corresponding set-up request messages and discovery messages. This provides for a simple way of ensuring that matched pairs set-up request messages and discovery messages can be found. Alternatively, client device 10 may use identifiers specifically for the purpose of message matching. In this case server device 12 may select the session identifier and transmit information linking the session identifier to the identifier used by client device 10. In another embodiment the identifiers in set-up request messages and discovery messages may be omitted, server device 12 searching for matching pairs only on the basis of source addresses of the messages.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of operating a server device for reduction of transport configuration latency during provision of streaming of multimedia data from the server device to a client device using at least one wireless network, the method comprising:
receiving first and second messages associated with a setup process for a first media data stream of the multimedia data;
correlating data of the first and second messages in order to enable configuration of a transport for the first media data stream without requiring further receipt of any messages relating to the setup process for the first media data stream;
receiving third and fourth messages associated with a setup process for a second media data stream of the multimedia data;
correlating data of the third and fourth messages in order to enable configuration of a transport for the second media data stream without requiring further receipt of any messages relating to the setup process for the second media data stream; and
based at least on establishment of the transport for the for the first media data stream and the transport for the second media data stream, causing streaming of the first and second media data streams to the client device;

wherein the second message and the fourth message are distinguished according to respective ports of the server device at which the second message and the fourth message arrive;

wherein the receiving of the second message and the receiving of the fourth message comprise receiving a first discovery message and receiving a second discovery message, respectively;

wherein the receiving of the first message and the receiving of the third message comprise receiving a first setup message and receiving a second setup message;

wherein the receiving of the first message and the second message comprises receiving a composite setup request, the composite setup request comprising the first setup message and the first discovery message, the first setup message and the first discovery message received at and from different ports, respectively.

2. The method of claim 1, further comprising using pairing from the first setup message and port information from the first discovery message that has been paired with the first setup message, the pairing ensuring that a minimum of roundtrip messages is needed.

3. A method of operating a server device for reduction of transport configuration latency during provision of streaming of multimedia data from the server device to a client device using at least one wireless network, the method comprising:

receiving first and second messages associated with a setup process for a first media data stream of the multimedia data;

correlating data of the first and second messages in order to enable configuration of a transport for the first media data stream without requiring further receipt of any messages relating to the setup process for the first media data stream;

receiving third and fourth messages associated with a setup process for a second media data stream of the multimedia data;

correlating data of the third and fourth messages in order to enable configuration of a transport for the second media data stream without requiring further receipt of any messages relating to the setup process for the second media data stream;

based at least on establishment of the transport for the for the first media data stream and the transport for the second media data stream, causing streaming of the first and second media data streams to the client device; and using pairing from the first setup message and port information from the first discovery message that has been paired with the first setup message, the pairing ensuring that a minimum of roundtrip messages is needed;

wherein the second message and the fourth message are distinguished according to respective ports of the server device at which the second message and the fourth message arrive;

wherein the receiving of the second message and the receiving of the fourth message comprise receiving a first discovery message and receiving a second discovery message, respectively:

wherein the receiving of the first message and the receiving of the third message comprise receiving a first setup message and receiving a second setup message;

wherein the receiving of the first message and the second message comprises receiving a composite setup request, the composite setup request comprising the first setup message and the first discovery message, the first setup message and the first discovery message received at and from different ports, respectively.

* * * * *